Jan. 13, 1948. M. BONNET 2,434,385
APPARATUS FOR OBTAINING PHOTOGRAPHS GIVING AN IMPRESSION OF RELIEF
Filed Jan. 3, 1938 3 Sheets-Sheet 1

Inventor
M. Bonnet
By: Glascock Downing & Seebold
Attys.

Jan. 13, 1948. M. BONNET 2,434,385
APPARATUS FOR OBTAINING PHOTOGRAPHS GIVING AN IMPRESSION OF RELIEF
Filed Jan. 3, 1938 3 Sheets-Sheet 2
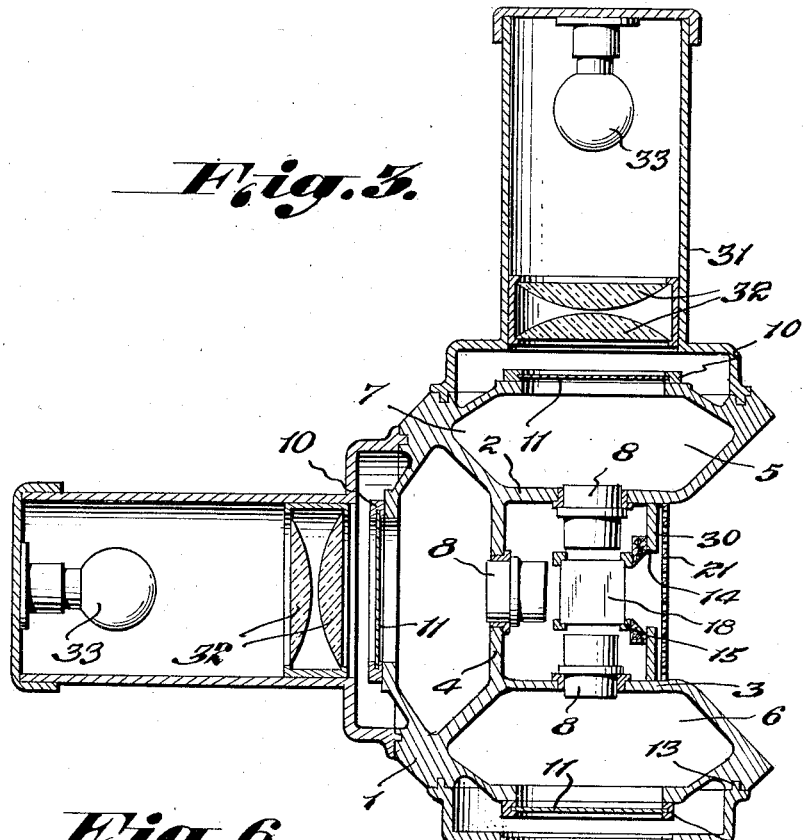
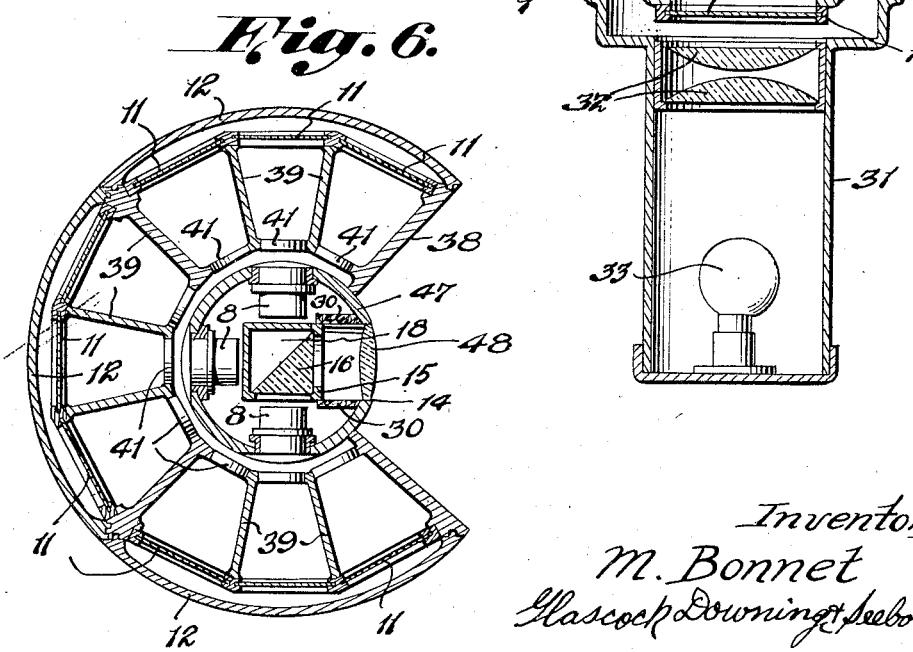
Inventor,
M. Bonnet
Glascock Downing & Seebold
By: Attys.

Jan. 13, 1948. M. BONNET 2,434,385
APPARATUS FOR OBTAINING PHOTOGRAPHS GIVING AN IMPRESSION OF RELIEF
Filed Jan. 3, 1938 3 Sheets-Sheet 3
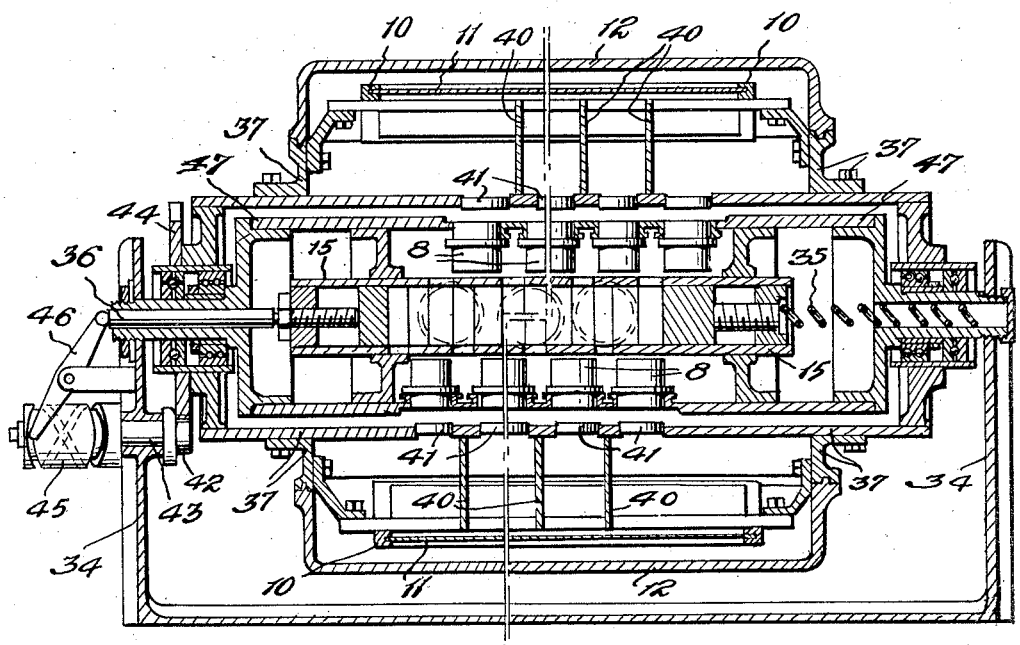
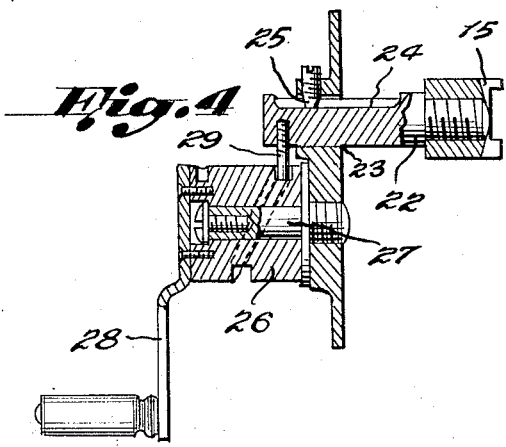
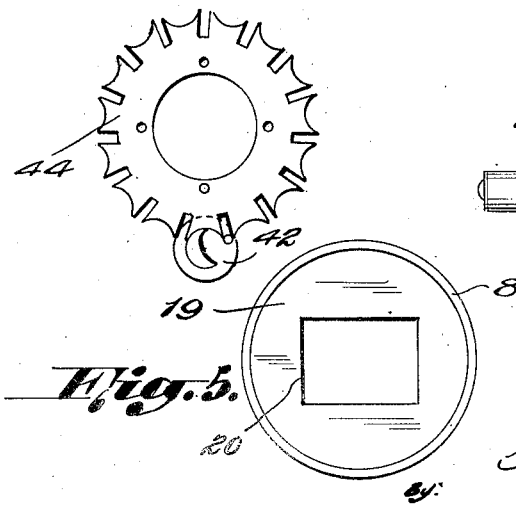
Inventor,
M. Bonnet
Glascock Downing & Seebold
Attys.

Patented Jan. 13, 1948

2,434,385

UNITED STATES PATENT OFFICE 2,434,385

APPARATUS FOR OBTAINING PHOTO-
GRAPHS GIVING AN IMPRESSION OF
RELIEF

Maurice Bonnet, Paris, France, assignor to Société
La Reliephographie Société pour l' Exploitation
des Procédés de Photographie en Relief, Maurice Bonnet, Paris, France, a corporation of
France Application January 3, 1938, Serial No. 183,213
In France July 2, 1937

Section 3, Public Law 690, August 8, 1946
Patent expires July 2, 1957

7 Claims. (Cl. 88—16.6)

The present invention relates to apparatus for obtaining photographs giving the impression of relief.

It is known to obtain, by means of various processes, photographs giving an impression of relief. According to one of these processes the exposure is effected by means of a photographic apparatus comprising a plurality of objectives arranged side by side in one horizontal row, and the optical axes of which are parallel, in such a way as to obtain on a sensitive plate a series of negative images of the object, this plate being, when the images have been developed, placed in one apparatus or in an identical apparatus and projected on another sensitive plate through a network of parallel slots arranged perpendicular to the row of objectives in such a way as to form a series of positive images of the object; the latter plate, once its images have been developed, is observed through the said network thereby causing the object to have an impression of relief.

According to this method the objectives of the photographic apparatus are all arranged side by side in the same row and the images which they form of the object are also obtained side by side on a single plate. It will be understood that under these conditions the object will be viewed only from a successive series of view-points, each of which corresponds to one objective in the row. This forms a somewhat discontinuous image of the object. There exist between each objective unobserved zones which, when the final positive image is viewed produce a flickering and discontinuous effect which it is important to eliminate.

The principal object of the invention is to permit the object to be seen not by a discontinuous series of view points but by a practical continuous vision band, due to which the disadvantages hereinabove mentioned are completely eliminated.

By the device which forms the object of the invention, a certain number of series of photographs are taken on the same number of plates arranged in different planes by means of an equal number of series of objectives arranged in different planes, these objectives being combined with suitable reflecting or refracting optical devices such as mirrors, prisms, or the like, in such a way that all the photographs obtained appear to be taken with objectives all arranged in a single row.

The photographic plates are then developed and replaced in the same position and in the same apparatus or an identical apparatus which is then used in order to project on to a single photographic plate the said photographs so as to obtain a series of partially superposed positive images of the object.

By means of the device described it is possible to obtain, upon exposure of a plurality of plates by means of a series of objectives arranged in several planes, a large number of photographs which are perfectly separated from each other while appearing to have been taken with the same number of objectives, but located side by side in a single row, the diaphragm apertures of said objectives appearing to be exactly juxtaposed in order to form a continuous observation band.

A description will be given hereunder of two forms of embodiment of an apparatus for putting the invention into practice, in which embodiments certain of the objectives are combined with total reflecting prisms in such a way as to be adapted to be arranged in planes perpendicular to that of the other objectives.

The second form of embodiment renders it possible to obtain photographs giving simultaneously with the impression of relief the colours of the object by taking upon exposure three series of photographs on panchromatic plates and through screens coloured in a suitable manner, by developing these plates and then projecting these plates through the same coloured screen which has been used for the exposure and, as in the previous case, through a network on to a single plate having coloured pigments, for example an autochrome plate which when developed, but not inverted, is viewed through the said network.

In the accompanying drawings:

Figure 3 is a view in cross-section of the apparatus used for the projection of images on the plate which is viewed through a network;

Figure 4 is a view in cross-section of one embodiment of the apparatus for actuating the support of the prisms of the apparatus;

Figure 5 is a diagrammatic view on a larger scale and in elevation of the diaphragm of one of the objectives of the apparatus;

Figure 6 is a view in cross-section of a second embodiment of the apparatus used for exposure;

Figure 7 is a view in axial longitudinal section of the second embodiment;

Figure 8 is a view of a Maltese cross device employed in the second embodiment.

Figure 1:
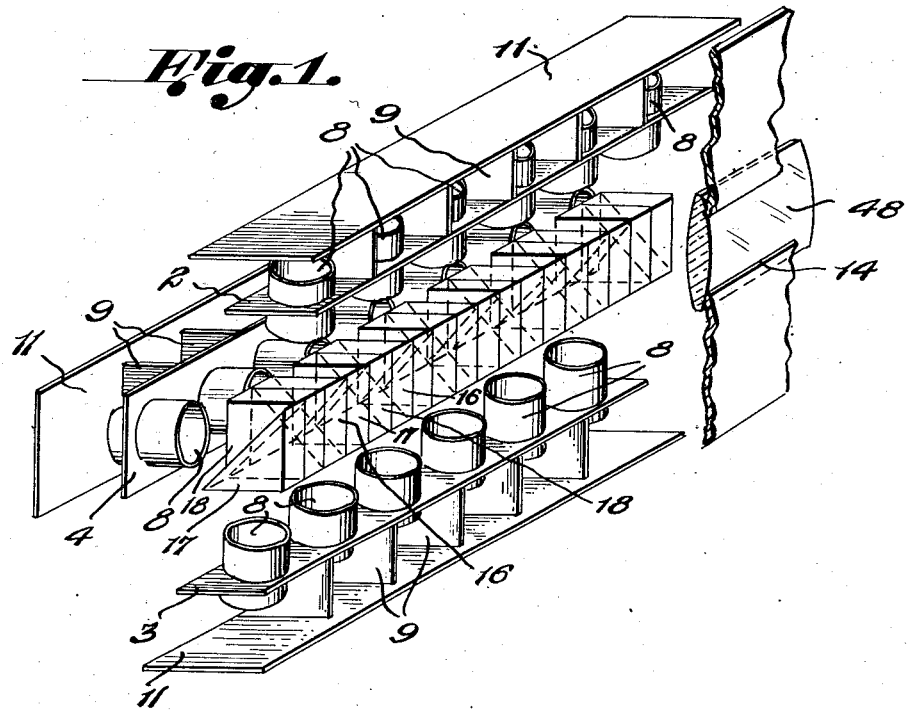
Figure 1 is a perspective diagrammatic view showing the structure of a first form of apparatus according to the invention.
Figure 2:
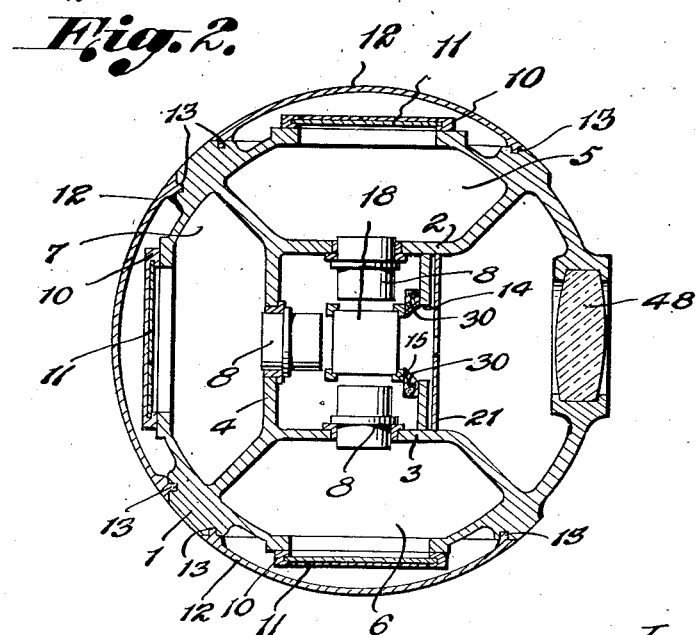
Figure 2 is a view in cross-section of this first apparatus when used for an exposure.

The photographic apparatus which is represented in Figures 1, 2 and 3 is formed by a frame 1 of elongated form and having a section substantially in the form of a cross having internally two walls 2 and 3 which are parallel to each other and perpendicular to a third wall 4, these walls 2, 3 and 4 each forming respectively the bottom of a chamber 5, 6 and 7 opening towards the outside.

The walls 2, 3 and 4 are each pierced with holes directed perpendicular to the said walls, the axes of the holes pierced in the walls 2 and 3 being contained in a single plane which is perpendicular to the plane containing the axes of the holes pierced in the wall 4.

The holes pierced in the wall 2 are staggered longitudinally relative to the holes pierced in the wall 3 which are themselves staggered by an equal distance relative to the holes pierced in the wall 4 in such a way that between the axes of the two first holes pierced in the wall 4 commencing from one of its ends is located the axes of the first pierced holes beginning from the same extremity in the walls 2 and 3.

Objectives 8 of the same optical characteristics are mounted in the holes of the walls 2, 3 and 4 and partitions 9 are arranged transversely between the objectives 8 in the chambers 5, 6 and 7 in such a way as to form in the latter chambers each corresponding to one objective (Figure 3).

The chambers 5, 6 and 7 which open towards the outside can each be closed in the ordinary manner by a carrier 10 carrying a sensitive plate 11. These carriers 10 are mounted in the known manner and operate as in the usual photographic apparatus. Covers 12 of suitable form and mounted in grooves 13 provided for this purpose on frame 1 at each side of the carrier 10 cover the carriers and ensure perfect protection.

The objectives 8 mounted in holes pierced in the wall 4, which are arranged opposite the aperture 14 of the frame 1, may be directed directly on the object.

The objectives 8 which are mounted in the holes pierced in the walls 2 and 3, and which on this account cannot be directed directly on the object, are combined with total reflecting prisms.

For this purpose inside the frame 1 is arranged a support 15, the axis of which is coincident with the line of intersection of the planes containing the axes of the objectives 8, and in which are mounted, secured in any suitable manner, total reflecting prisms 16 and 17 arranged so as to refract the light rays coming from the object towards the objectives 8 carried by the walls 2 and 3.

Right-angled prisms 18, but of square section double that of the prisms 16 and 17 and of the same transparent material as the latter, are also mounted in the support 15 in such a way as to be traversed by the light rays received by the objectives 8 carried by the wall 4 so that all the objectives 8 receive an equal intensity of illumination.

The objectives 8, carried by the walls 2, 3 and 4, are arranged so that the optical axes of the optical assemblies, which each forms with the prism corresponding to it, are all contained in the same plane and are parallel to one another.

The prisms 16, 17 and 18 which are all of the same width, for example a width substantially equal to one-third of the distance separating two adjacent objectives of a single row of objectives, are covered over their whole surface, except on their two faces through which the light rays enter or leave, with a suitable opaque covering of black colour in order to prevent any reflection of light.

The objectives 8 comprise internally a fixed diaphragm 19 having a rectangular aperture 20 of small width and the length of which is equal to the thickness of the prisms 16, 17 and 18.

The support 15 may be fixedly mounted in the frame 1 and in this case the prisms 16, 17 and 18 are arranged along the axis of the objectives corresponding to them, and an obturator 21 of a known type, for example a slot obturator, the slot of which is arranged parallel to the longitudinal axis of the apparatus, moves in front of the aperture 14.

According to one feature of the invention however, the support 15 is adapted to be movable and can slide in the frame 1, both during exposure and during formation of the image, in such a way that each prism 16, 17 and 18 moves parallel to itself in front of the objective corresponding to it while forming for the other objectives an obturator due to the fact that its non-working surfaces are blackened as above mentioned.

For this purpose the support 15 is slidably mounted in the frame 1 and moves in guides formed and arranged in suitable manner.

The path of the support 15 is determined so that each prism 16, 17 and 18 moves from a position situated on one side of the objective corresponding to it, for which the rays which traverse it cannot reach this objective up to a position situated on the said side of said objective for which also the rays which traverse it cannot arrive at this objective.

The support 15 may be actuated for example by a device similar to those actuating the obturator devices of photographic apparatus and moving the support 15 with a constant speed from one to the other of its two extreme positions.

In the embodiment shown in Figure 4 the support 15 is terminated at its two extremities by two rods 22 which slide in holes 23 provided for this purpose in the cheeks of the apparatus.

The locking in rotation of the support 15 is obtained by means of a groove 24, preferably of conical section, provided in each rod and with studs 25 having conical extremities secured on the cheeks of the apparatus and lodged in the grooves 24. The support 15 is actuated in its translatory movement by means of a grooved cam 26 mounted on a shaft 27 secured to one of the cheeks, which cam may be rotated by a crank 28 and which may act on a stud 29 secured at the end of the corresponding rod 22.

According to this latter embodiment, light excluding means, as for example two small velvet pads 30 are secured along the edges of the aperture 14 inside the frame so as to come in contact with the support 15 (Figure 3).

The objectives 8 carried by the three walls 2, 3 and 4 thus render it possible to obtain on the sensitive plates 11 which correspond to them, series of images which are staggered, when considering these three plates, by a distance equal to that by which are staggered the series of objectives 8 carried by the walls 2, 3 and 4.

With the photographic apparatus as described hereinabove, loaded with three sensitive plates 11 arranged respectively in the chambers 5, 6 and 7, the object being arranged at a certain distance from the apparatus, the exposure is effected as in an ordinary apparatus either by operating the obturator 21 when the prisms are mounted in a support 15 fixedly mounted in the frame 1, or by causing the displacement of the support 15 if the latter is movably mounted in the frame 1.

The plates 11 are then developed in the ordinary manner, and when the images have been formed the plates 11 are replaced in the apparatus so as to be used for the exposure, or in an identical apparatus in the same position which they occupied during the exposure.

The covers 12 are replaced by illuminating devices constituted by a casing 31 comprising a condenser 32 and an electric discharge tube 33 extending over the whole length of the apparatus.

The photographic apparatus thus constitutes a projecting apparatus by means of which the images of the three plates 11 are projected on to a sensitive plate through a network of vertical lines the plane of which is located at the same distance from the apparatus as was the object.

The network is preferably constituted in the manner indicated above thus permitting the particular advantages mentioned to be obtained. It may, however, also be formed by an ordinary ruled half-tone screen.

In the manner also known, the photographic plate obtained is developed and is then replaced in the same position with respect to the network. If the assembly constituted by this plate and the network is then examined and if the observer places himself at a distance about the same as that from which the exposure was made, there will be seen through the network an image of the object giving a perfect impression in relief of the object.

The photographic apparatus which is represented in Figures 6 and 7 is based on the same principle as the apparatus above described, and comprises three rows of objectives 8 arranged in such a way that the axes of the objectives are contained in two perpendicular planes, the two first rows of objectives being located on either side of the plane of the axes of the third row of objectives which can be directed towards the object, total reflecting prisms arranged in a suitable manner with respect to the two first rows of objectives constituting together with the latter, optical assemblies similar to objectives which would be arranged on the third row of objectives.

The objectives 8 are mounted in a casing 47 of general cylindrical form which is secured at its two ends, having the form of hollow shafts, on a support frame 34. The support 15 of the prisms 16, 17 and 18 is mounted for example slidably in the casing 47; it is subjected at one of its ends to the action of a return spring 35 tending to hold it constantly in one of its end positions and at the other end to the action of a control rod 36 passing inside one of the hollow shafts of the casing 47. Two small velvet pads 30 form a seal between the support 15 and the aperture 14 of the said casing 47.

The casing 47 is arranged inside a second casing 37 which is pivotally mounted around the hollow shafts of the casing 47.

This casing 37 is provided opposite the aperture 14 of the casing 47 with a suitable aperture 38. It comprises internally, longitudinal partitions 39 which divide it into nine chambers extending longitudinally and corresponding by series of three adjacent chambers with a single row of objectives, and arriving successively opposite the said objectives upon the rotation of the casing 37. These chambers are divided by transverse partitions 40 into as many small chambers as there are objectives in each row of objectives.

Coloured screens 41 are arranged in the opening provided in the wall forming the bottom of each of the chambers in such a way as to correspond to each objective. These screens 41 which are of the same colour for all the small chambers arranged in a single row, are coloured differently in the three rows of small chambers corresponding to a single row of objectives, for example in red-orange, green and blue-violet.

Carriers 10 carrying a sensitive plate 11 each delimit one row of small chambers. Covers 12 give as previously mentioned protection for the carriers and plates.

The casing 37 may be rotated by a suitable device of the "Maltese cross" type constituted by a plate 42 keyed on the control shaft 43 and driving intermittently another plate 44 secured on the casing 37. These plates 42 and 44 are arranged so that, for example a rotation of 360° of the shaft 43 causes a rotation of the plate 44 such that beginning from the casing 37 the rows of chambers arranged opposite the objectives are replaced by other rows of these small chambers. On the control shaft 43 is keyed a cam drum 45 actuating a lever 46 which causes the translatory movements of the support 15 for each exposure when the casing 37 is locked into position for which the objectives 8 of each of the three rows of objectives correspond to one row of small chambers and therefore to a sensitive plate 11.

With this apparatus operation is carried out substantially in the same manner as with the previously described apparatus, in that the exposure is effected with the panchromatic plates, that is to say plates sensitive to all the luminous radiations and the photographs are taken through screens coloured with the three fundamental colours.

Upon the exposure, three series of photographs are taken of the subject placed in the known manner through screens of red-orange, green and blue-violet and on panchromatic plates. These plates are then developed and replaced in the same apparatus or any identical apparatus in the same position as during the exposure. The covers 12, having been replaced by casings comprising a condenser and a projecting lamp, the photographs of the plates are projected on a plate with colour pigments, for example an autochrome plate, through a network arranged at the same distance from the apparatus as was the object. The latter plate is developed but not inverted, and is then replaced in the same position relative to the network.

If the assembly formed by this plate and the network is then illuminated from behind and if an observer places himself at a distance about the same as that at which the exposure was made, there will be seen through the network an image of the object with its natural colours and giving a perfect impression of relief.

Another improvement according to the invention consists in interposing in the path of the rays between the objectives and the object during exposure, or between the objectives and the final plate upon projection, one or several lenses 48 common to all the objectives in order to obtain a final image on a scale other than the scale corresponding to the direct exposure.

Without this field lens 48, the objectives being naturally operated with a fixed focus, the image can only be reproduced on the same size and in the plane of the exposure. It renders possible, for example if a negative lens is used for the exposure, the reproduction of the object in a plane nearer the objectives and conversely. The applications of the apparatus are thus increased.

I claim:

1. In apparatus for taking photographs and for projecting several partial images to form stereograms, a plurality of horizontal rows of objectives circumferentially displaced relatively to each other, a corresponding continuous common horizontal row of fixed means for distributing light between the objectives, and an obturator having a slot orientated in the direction of the length of the rows of objectives.

2. In apparatus for taking photographs and for projecting several partial images to form stereograms, a plurality of horizontal rows of objectives circumferentially displaced relatively to each other, a corresponding continuous common horizontal row of means for distributing light between the objectives, said means being narrower than the objectives and mounted in a common support sliding horizontally in a path larger than the diameter of an objective so as to utilize each objective and to use the light distributing means as obturators for said objectives.

3. In apparatus for taking photographs and for projecting several partial images to form stereograms, a plurality of horizontal rows of objectives circumferentially displaced relatively to each other, a corresponding continuous common horizontal row of means for distributing light between the objectives, a body of polygonal section having a number of sides corresponding to the number of rows of objectives supporting the objectives, means for supporting negatives, and means for supporting illuminating devices used for projecting the images.

4. In apparatus for taking photographs and for projecting several partial images to form stereograms in colors, a plurality of horizontal rows of objectives circumferentially displaced relatively to each other, a corresponding continuous common horizontal row of means for distributing light between the objectives, a body of polygonal shape having a number of sides corresponding to the number of rows of objectives supporting said rows of objectives, means for supporting negatives, means supporting illuminating devices used for projecting, said body forming three fields of impression for each objective and carrying three corresponding colored filters.

5. In apparatus for taking photographs and for projecting several partial images to form stereograms in colors, a plurality of horizontal rows of objectives circumferentially displaced relatively to each other, a corresponding continuous common horizontal row of means for distributing light between the objectives, a body of polygonal section having a number of sides corresponding to the number of rows of objectives supporting said rows of objectives, means for supporting negatives, means for illuminating the negatives during projection, said body forming three fields of impression for each objective and carrying three corresponding colored filters, a fixed support for said rows of objectives, means for rotating said body around said objectives for causing the three colored filters and the three fields of impression to correspond successively with the objectives.

6. In apparatus for taking photographs and for projecting several partial images to form stereograms in colors, a plurality of horizontal rows of objectives circumferentially displaced relatively to each other, a corresponding continuous common horizontal row of means for distributing light between the objectives, a body of polygonal section having a number of sides corresponding to the number of rows of objectives supporting the said rows, said body forming three fields of impression for each objective and carrying three corresponding colored filters, a fixed support for the rows of objectives, said body being mounted for rotation around said objectives for causing the three colored filters and the three fields of impression to correspond successively with the objectives, a fixed frame, a crank rotatable on the frame and an integral socket rotatable therewith carrying an external helical groove, a double lever pivotally mounted on said frame, a pin at one end of the lever engaging in said groove, and means associated with the other end of the lever for intermittently rotating said body.

7. In apparatus for taking photographs and for projecting several partial images to form stereograms, a plurality of horizontal rows of objectives circumferentially displaced relatively to each other, a corresponding continuous common horizontal row of means for distributing light between the objectives, a body of polygonal section having a number of sides corresponding to the number of rows of objectives supporting the said rows, means for supporting a single flexible negative on said body, and illuminating devices for the projection of images of the negatives.

MAURICE BONNET.

REFERENCES CITED

The following references are of record in the file of this patent:

UNITED STATES PATENTS

| Number | Name | Date |
|---|---|---|
| 632,573 | Ives | Sept. 5, 1899 |
| 1,187,884 | Brigden | Aug. 22, 1933 |
| 1,923,987 | Luboshez | Feb. 18, 1934 |

FOREIGN PATENTS

| Number | Country | Date |
|---|---|---|
| 278,394 | Great Britain | Feb. 2, 1928 |
| 15,726 | Great Britain | July 9, 1907 |
| 566,611 | France | Feb. 18, 1934 |